Patented Oct. 16, 1951

2,571,533

UNITED STATES PATENT OFFICE 2,571,533

METHOD FOR PREPARING HEAT-HARDENABLE ORGANOPOLYSILOXANE RESINS

Edgar C. Britton and Halbert C. White, Midland, Mich., assignors to The Dow Chemical Company, Midland, Mich., a corporation of Delaware No Drawing. Application March 29, 1947, Serial No. 738,230

4 Claims. (Cl. 260—46.5)

This invention concerns heat-hardenable organopolysiloxane resins which have improved aging and curing properties. It is particularly concerned with the preparation of complex condensation products from organopolysiloxanes containing phenyl and lower alkyl radicals as the organic substituents. The process of our invention is of even more particular advantage when the organopolysiloxane starting material is such that the ratio of the total number of hydrocarbon radicals to the total number of silicon atoms is at least 1 and not more than 2.

Organopolysiloxanes of the type with which this invention is concerned are ordinarily prepared by the hydrolysis of hydrolyzable organosilicon compounds of the general formula $$R_nSiX_{4-n}$$

where R is a monovalent hydrocarbon radical, X represents a readily hydrolyzable group, e. g. bromine, chlorine, or an alkoxy group, etc., and $n$ is a whole number of value 1 or 2. Frequently a mixture of such hydrolyzable compounds is employed. Mixtures which include minor amounts, e. g. 10 percent or less, of an inorganic tetrahalosilane, a triorganohalosilane, etc., also yield hydrolysis products satisfactory for use in this invention. As is known, the hydrolysis is accompanied by concurrent condensation of the hydrolysis is accompanied by concurrent condensation of the hydrolysis products, with formation of organosiloxane polymers, which usually are soluble in organic solvents, and frequently are thin liquids.

These hydrolysis products may in turn be converted by known methods, e. g. by heating at 100° C. or above, into complex condensation products which are generally insoluble, infusible solids. Because of their resinous properties, the latter materials are adapted for a wide variety of applications, e. g. as coatings, binders, impregnating agents, etc. However, when prepared by methods ordinarily employed in the art, such as by heating in the presence of a solvent, the ultimate solid product is frequently brittle and lacking in strength and other properties desirable in a resinous coating, such as an enamel for wire.

We have found that solid complex organosiloxane condensation products of improved properties for use as coatings, etc., may be prepared from the hydrolysis products discussed above, by bodying such hydrolysis product to an intermediate stage of condensation short of solidification; treating the resultant product with a minor amount of an alkaline reacting substance and subsequently completing the solidification by usual methods of curing, e. g. by heating after application to the surface where it is to be employed. More specifically we have found that such treatment with alkali of a liquid organopolysiloxane which has been bodied by other means, e. g., by heating, results in the production of a heat-hardenable resinous polymer having a shorter curing time as well as a longer flex life and a longer craze life than can be achieved by conducting the resinification of the hydrolysis product either by heat-bodying alone, or by the presence of an alkaline reacting agent throughout the said bodying process. We have further found that the initial step of partial bodying of the hydrolysis products, prior to the alkali treatment, contributes to the flexibility of the product and is advantageous for the preparation of flexible, enamel-like coatings from liquid organopolysiloxanes of the type described above. By "curing time" we mean the number of hours of heating at a given temperature which is necessary to form a tack-free coating on a panel treated with the organosiloxane polymer. The "flex life" indicates the number of hours of heating at a given temperature which a coating on a metal panel will withstand, before it loses its flexibility upon cooling and cracks when bent over an eighth inch mandrel at room temperature. By "craze life" we mean the number of hours of heating at a given temperature which a portion of the tack-free organosiloxane resin will withstand before cracking or crazing occurs.

In general, we prefer to conduct the initial condensation step by heat-bodying the hydrolysis product in contact with air, but it may be accomplished in other known ways. The hydrolysis product may be admixed with a minor amount, e. g. 10-40 percent by weight, of an inert diluent such as benzene, toluene, etc., prior to bodying. The mixture is then heated for several hours at a temperature of 100°-200° C. or thereabouts. The extent to which the bodying is carried depends somewhat upon the particular resin being treated, but in general, the treatment should be arrested before the viscosity has become too great to permit thorough mixing by usual means. A suitable stopping point for this step of the process is when a 50 percent by weight solution of the resin in the diluent has a viscosity of 25-75 centipoises, or thereabouts, at room temperature.

In a preferred mode of carrying out the second step of the process, the intermediate heat-bodied organosiloxane polymer mixture is treated with an alkaline reacting substance, e. g. sodium hydroxide, by procedure similar to that disclosed in a copending application, Serial No. 738,232, filed as of even date by E. C. Britton and L. W. Byers and now Patent Number 2,521,674. Briefly, the procedure comprises adding small quantities of an alkaline reacting material to a solution of the organosiloxane and at least 5, usually from 10 to 60, percent by weight of an inert diluent such as an aromatic hydrocarbon, a liquid fraction of petroleum, or liquid cholorhydrocarbons, etc. Specific examples of such diluents are benzene, toluene, ligroin, carbon tetrachloride, chlorobenzene, etc. The diluent may be used in as large a proportion as desired.

The portionwise treatment of the organosiloxane solution with an alkaline substance may be carried out over a wide range of temperatures, e. g. from room temperature or below to 100° C. or even higher. Ordinarily we prefer to operate at temperatures in the range of from 20° to 100° C. Although a number of alkaline reacting agents are satisfactory, e. g. sodium hydroxide, potassium hydroxide, lithium hydroxide, and quaternary ammonium hydroxides such as tetramethyl ammonium hydroxide and benzyl trimethyl ammonium hydroxide, etc., we prefer to use sodium hydroxide for reasons of ready availability, ease of handling, etc. The optimum dosage varies, of course, with the material being treated, but usually lies within the range of from 0.5 to 1.25 gram molecular weights of the alkali per 1000 gram atoms of silicon present in the polymer. The alkali is preferably added as an aqueous solution or as an aqueous emulsion in an organic solvent such as a liquid hydrocarbon. In many cases it is advantageous to add the alkaline reacting agent in a portionwise manner.

The addition of the alkali portionwise results in a stepwise increase in viscosity of the organosiloxane resin during this stage of the resinification process. It will be noticed, for instance, that the addition of a portion of alkali with agitation, results in a rapid increase in viscosity for a short time, but the reaction soon reaches an equilibrium and no further increase in viscosity can be observed. At this point, a second portion of alkali is added, and the process is thereafter repeated, until a very viscous material is obtained. The portionwise treatment with alkali usually results in non-formation of hard gels or other insoluble resinous bodies. Any agglomerations of gel-like particles which are observed, may be readily broken up by vigorous agitation, etc.

It is frequently advantageous, but not essential, to regulate the rate of reaction by intermittently varying the concentration of diluent in the reaction mixture during the alkali treatment. This may be accomplished by addition or by removal of said diluent. For example, if the rate of resinification is very rapid, as indicated by very rapid thickening of the reaction mixture, the addition of a minor amount of solvent will usually slow up the process, and vice versa. The alkali treatment of the intermediate organosiloxanes is continued until the product has attained a viscosity predetermined to be satisfactory for the intended application of the organosiloxane resin.

Residual alkali present in the mixture may be conveniently neutralized in any of the usual ways, e. g. by reaction with an acid, such as hydrogen chloride, acetic acid, etc., or preferably by adding carbon dioxide thereto and filtering off the resultant alkali metal carbonate, etc.

The product of the foregoing operations is ordinarily a viscous solution of soluble complex products. It is usually of suitable body for direct employment as a coating lacquer or enamel. After being applied as a liquid film on supporting material such as wood or metal, etc., it may be freed of solvent and cured, or set up, by heating, e. g. at 135° C. or above to form a tightly adhering, insoluble, infusible solid film on the supporting material. In comparison with the products obtained when heat-bodying is employed throughout the entire process of resinification, the products of this invention are more resistant to continued heating and oxidation, i. e. they retain flexibility and do not craze or crack when heated at elevated temperatures, e. g. at 250° C., for long periods of time, such as 100 hours or more.

The following example serves to illustrate one mode of applying the principle of the invention, but is not to be construed as limiting its scope:

*Example*

A liquid phenylmethylsiloxane polymer containing an average of 0.67 phenyl radical and 0.95 methyl radical per silicon atom was prepared by the hydrolysis of a mixture of phenyl and methyl chlorosilanes. A 50 percent solution of the condensate in benzene had a viscosity of approximately 5 centipoises. A portion of the liquid polymer was bodied by heating at 160°-175° C. for about 7.5 hours, at which time a benzene solution containing 50 percent by weight of the phenylmethylpolysiloxane material had a viscosity of 55 centipoises.

To 254 grams of the heat-bodied material in 146 grams of a petroleum fraction, was added 0.125 milliliter of 50 percent aqueous sodium hydroxide, with stirring at 85° C. The viscosity rose rapidly, and in a few minutes the mixture became too thick to stir. Additional solvent was introduced to bring the concentration of solids to about 50 percent, and carbon dioxide was bubbled through to neutralize residual alkali. The product was then passed through a colloid mill to ensure homogeneity. The 50 percent solution of the resin had a viscosity of 3.6 poises. The portionwise addition of sodium hydroxide was continued until the total alkali added approximated 1 gram molecular equivalent thereof per 800 gram atoms of silicon in the resin. Residual sodium hydroxide was neutralized, as before, with carbon dioxide. The product was then diluted with petroleum fraction to a solids concentration of 23.5 percent. The viscosity of the solution was 7.5 poises.

The material was applied as a thin film to metal test panels, and the curing time, flex life and craze life determined.

In the following table is given the results obtained under comparable conditions for the original heat-bodied resin and the material after treatment with alkali.

Wires coated with a thin film of the alkali treated material cured in place possessed much greater ability to slip over each other without friction than when coated with the original heat-bodied resin, or left uncoated.

| Material Tested | Curing Conditions | | Flex Life, Hrs. at 250° C. | Craze Life, Hrs. at 250° C. |
|---|---|---|---|---|
| | Time, Hrs. | Temp., °C. | | |
| Resin heat-bodied without alkali | >30 | 150 | 30 | 144 |
| Resin heat-bodied with alkali | 1-2 | 135 | 165 | 492 |

Other modes of applying the invention may be employed instead of those described, provided the steps or compounds stated by any of the following claims, or equivalents of such steps or compounds be employed.

We therefore point out and claim as our invention:

1. A method of preparing a solid resinous material from an organopolysiloxane containing monovalent hydrocarbon radicals as the organic portion of the molecule and having an average of at least one and less than 2 hydrocarbon radicals per atom of silicon, the hydrocarbon radicals being attached to silicon atoms, which method comprises heat-bodying said organopolysiloxane to a consistency intermediate between the starting organopolysiloxane and the solid resinous material, treating the intermediate product so obtained, in an inert solvent, with an alkaline reacting agent of the class consisting of alkali metal hydroxides and quaternary ammonium hydroxides in amount corresponding to from 0.5 to 1.25 gram molecular equivalents of the alkali per thousand gram atomic weights of silicon in the organopolysiloxane, and thereafter solidifying the resinous material.

2. A method of preparing a solid resinous material from an organopolysiloxane containing monovalent hydrocarbon radicals as the organic portion of the molecule and having an average of at least one and less than 2 hydrocarbon radicals per atom of silicon, the hydrocarbon radicals being attached to silicon atoms, which method comprises heat-bodying said organopolysiloxane to a consistency intermediate the starting organopolysiloxane and the solid resinous material, treating the intermediate product so obtained, in an inert solvent, at a temperature of from 20° to 100° C., with from 0.5 to 1.25 gram molecular equivalents of an alkali metal hydroxide per one thousand gram atomic weights of silicon in the organopolysiloxane, and thereafter solidifying the resinous material at a temperature of from 135° to 250° C.

3. A method of preparing a heat-hardenable, resinous material, adapted for use as a flexible coating for metals, from an organopolysiloxane in which the organic portion of the molecule consists of monovalent hydrocarbon radicals that are attached to silicon atoms and in which the ratio of the total number of monovalent hydrocarbon radicals to the total number of silicon atoms in the molecule is at least one and less than 2, which method comprises heat-bodying said organopolysiloxane to a consistency intermediate the starting organopolysiloxane and a resinous solid and thereafter treating the intermediate product so obtained, in an inert solvent, with an alkali metal hydroxide in an intermittent portionwise manner at a temperature of from 20° to 100° C. to produce a viscous, heat-hardenable resinous material, the alkali metal hydroxide being employed in amount corresponding to from 0.5 to 1.2 gram molecular equivalents thereof per one thousand gram atomic weights of silicon in the organopolysiloxane.

4. A method of preparing a heat-hardenable, resinous material which comprises heat-bodying a phenyl-methyl polysiloxane in which the phenyl and methyl radicals are attached to silicon radicals and in which the ratio of the total number of phenyl and methyl radicals to the total number of silicon atoms in the molecule is at least one and less than 2, to a consistency such that a 50 percent solution of the said heat-bodied phenyl-methyl polysiloxane resin in toluene has a viscosity of at least 25 centipoises at room temperature, and thereafter treating the intermediate product so obtained, in an inert solvent, with sodium hydroxide in an intermittent portionwise manner at a temperature of from 20° to 100° C., and recovering a heat-hardenable, resinous material, the sodium hydroxide being employed in amount corresponding to from 0.5 to 1.2 gram molecular equivalents thereof per one thousand gram atomic weights of silicon in the organopolysiloxane.

EDGAR C. BRITTON.
HALBERT C. WHITE.

REFERENCES CITED

The following references are of record in the file of this patent:

UNITED STATES PATENTS

| Number | Name | Date |
|---|---|---|
| 2,258,222 | Rochow | Oct. 7, 1941 |
| 2,371,068 | Rochow | Mar. 6, 1945 |
| 2,386,466 | Hyde | Oct. 9, 1945 |
| 2,389,477 | Wright | Nov. 20, 1945 |
| 2,405,041 | Mathes et al. | July 20, 1946 |
| 2,410,346 | Hyde | Oct. 29, 1946 |
| 2,432,665 | Hyde | Dec. 16, 1947 |
| 2,435,147 | McGregor et al. | Jan. 27, 1948 |
| 2,443,353 | Hyde | June 15, 1948 |
| 2,448,556 | Sprung et al. | Sept. 7, 1948 |
| 2,460,795 | Warrick | Feb. 1, 1949 |
| 2,482,276 | Hyde | Sept. 20, 1949 |
| 2,490,357 | Hyde | Dec. 6, 1949 |

FOREIGN PATENTS

| Number | Country | Date |
|---|---|---|
| 573,960 | Great Britain | Dec. 14, 1945 |
| 583,875 | Great Britain | Jan. 1, 1947 |

OTHER REFERENCES

Meads et al.: J. Chem. Soc., vol. 107, 1915, pp. 459 to 468.

Kipping et al.: J. Chem. Soc. (London), 1928, pp. 1427–1431.